(No Model.) 3 Sheets—Sheet 1.

J. LUDWICK & H. H. AMBORN.
PORTABLE BAKE OVEN.

No. 564,798. Patented July 28, 1896.

Witnesses
W. C. Coolies
G. E. Mars

Inventors
Jerome Ludwick
Harrison H. Amborn
By Louis K. Gilson
Attorney

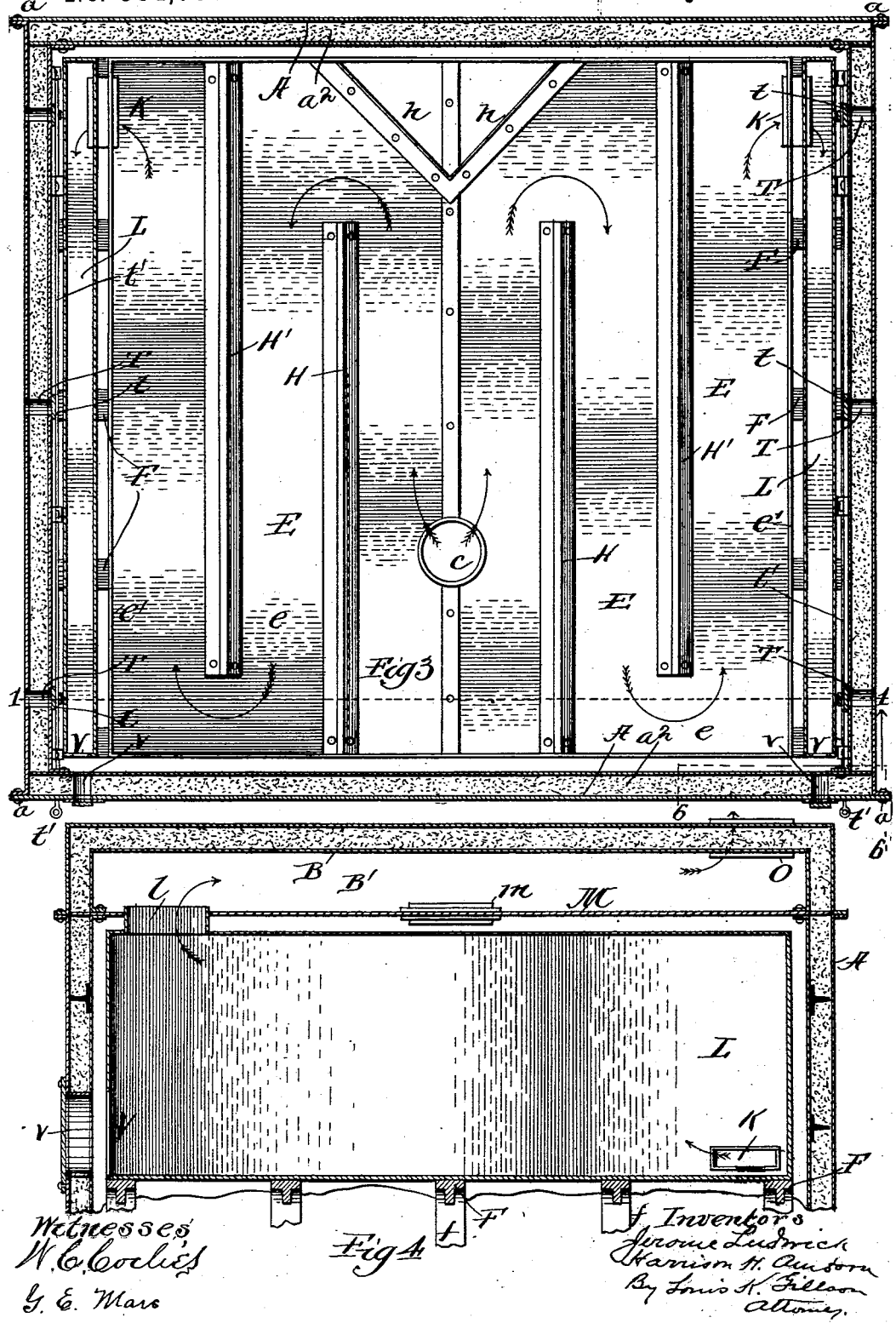

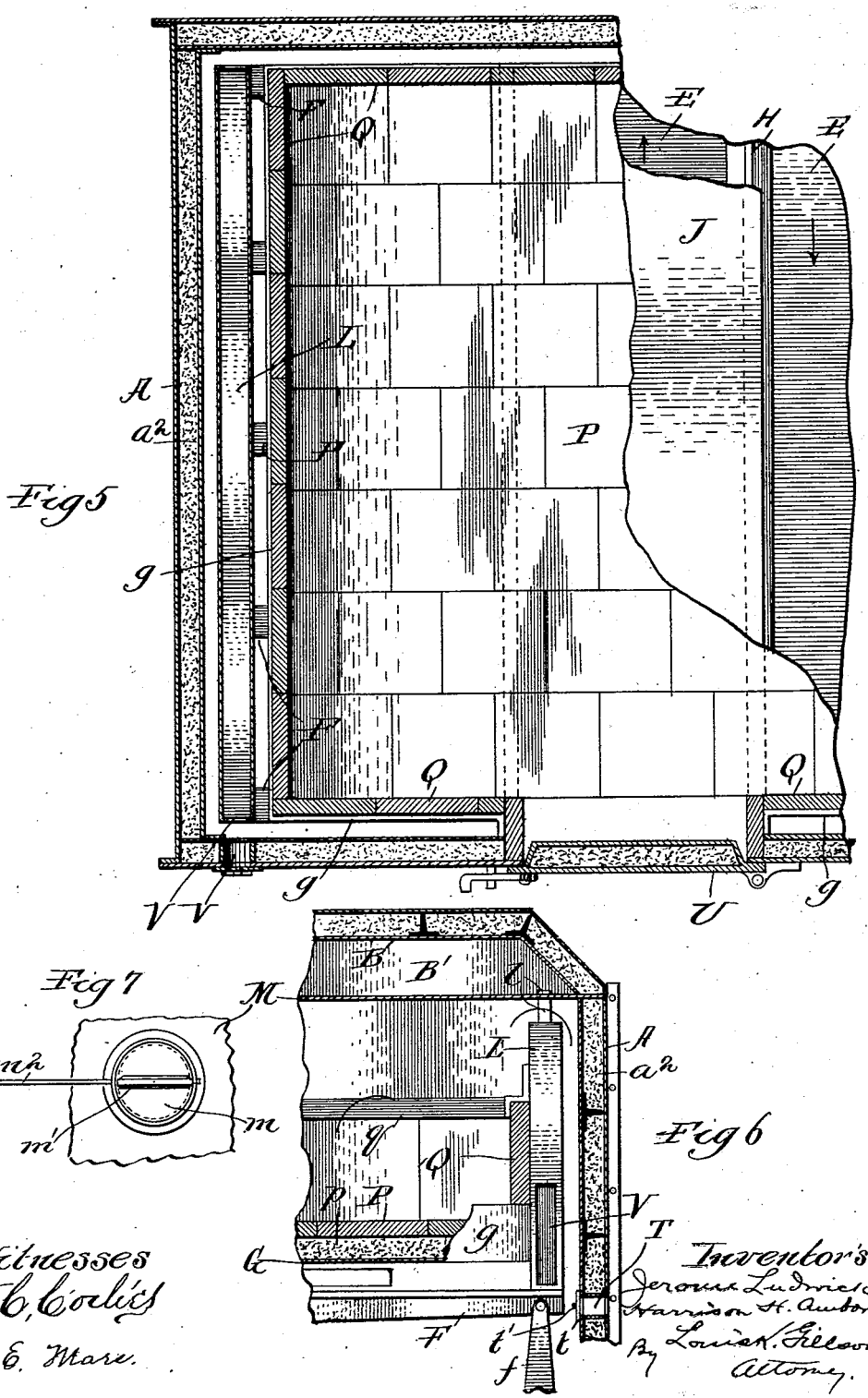

UNITED STATES PATENT OFFICE.

JEROME LUDWICK AND HARRISON H. AMBORN, OF CHICAGO, ILLINOIS.

PORTABLE BAKE-OVEN.

SPECIFICATION forming part of Letters Patent No. 564,798, dated July 28, 1896.

Application filed May 2, 1896. Serial No. 589,942. (No model.)

*To all whom it may concern:*

Be it known that we, JEROME LUDWICK and HARRISON H. AMBORN, citizens of the United States, residing at Chicago, in the county of Cook and State of Illinois, have invented certain new and useful Improvements in Portable Bake-Ovens; and we do declare the following to be a full, clear, and exact description of the invention, such as will enable others skilled in the art to which it appertains to make and use the same, reference being had to the accompanying drawings, and to the letters of reference marked thereon, which form a part of this specification.

The objects of the invention are to secure, in a portable bake-oven, economy of fuel by concentrating the heat within the baking-chamber, and, as a consequence, the added advantage of retaining the heat within the oven, so that the apartment within which it is set remains comparatively cool.

A further object is to provide an oven of this class which is capable of doing as fine baking as can be accomplished with a stationary oven of good construction.

The invention consists in so constructing the oven that the baking-chamber is flanked by smoke-flues which are in turn separated from the side walls of the oven by air-flues discharging into the baking-chamber, so that the heat radiated from the smoke-flues is substantially all concentrated within this chamber.

It consists, further, in such a construction of the floor of the baking-chamber and of the oven that sand may be utilized for retaining heat and moisture, and of various minor details of construction, as hereinafter pointed out.

Figure 1:
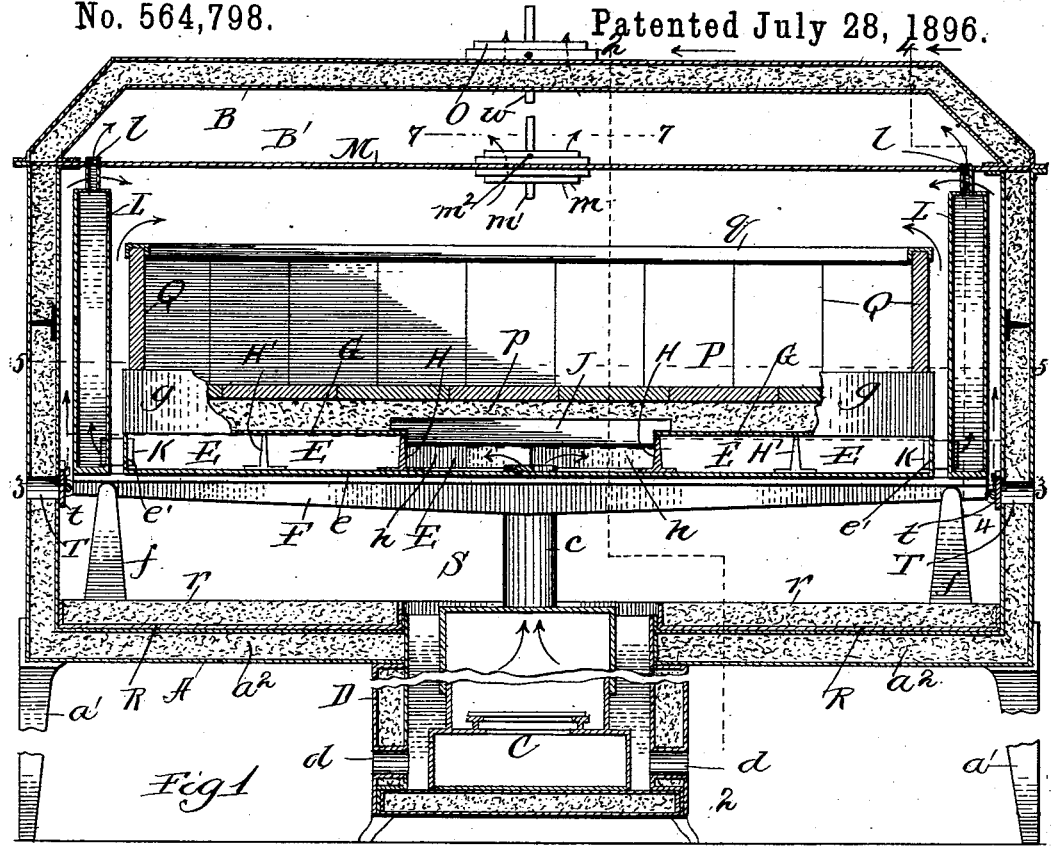
Figure 2:
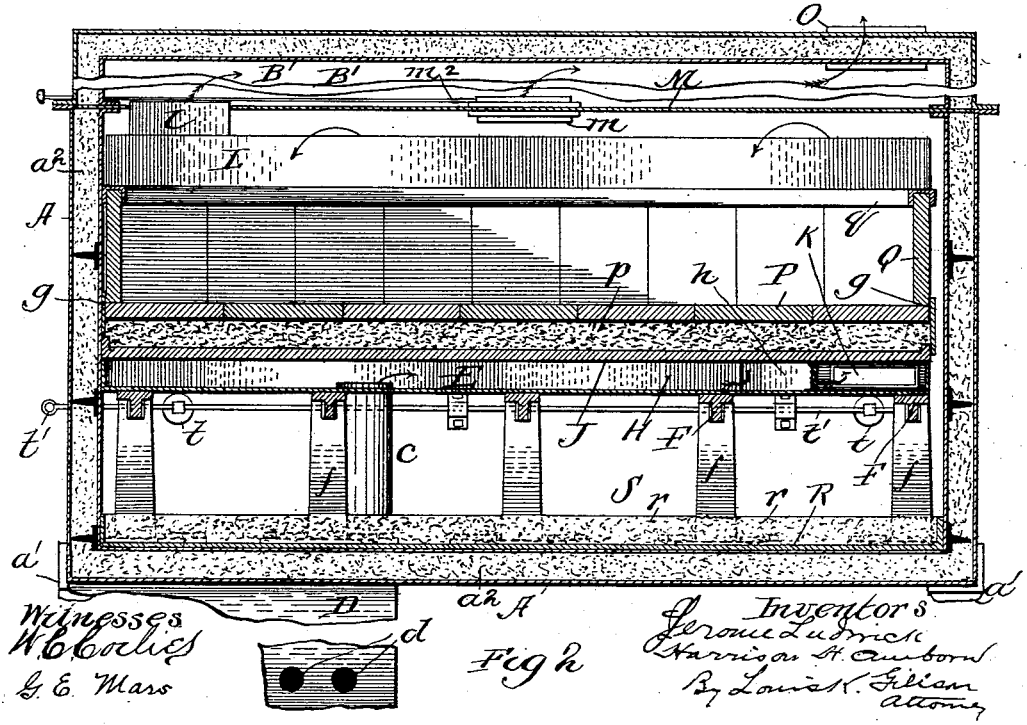

In the drawings, Figure 1 is a transverse vertical section of the oven a little back of its front wall, as indicated by the line 1 1 of Fig. 3. Fig. 2 is a longitudinal vertical section on the line 2 2 of Fig. 1, some of the parts being broken away. Fig. 3 is a plan section on the line 3 3 of Fig. 1. Fig. 4 is a vertical longitudinal section on the line 4 4 of Fig. 1. Fig. 5 is a plan section on the line 5 5 of Fig. 1, some of the parts being broken away. Fig. 6 is a detail vertical section on the line 6 6 of Fig. 3. Fig. 7 is a detail plan view from the line 7 7 of Fig. 1.

The casing or shell A of the oven is formed of double steel plates spaced apart to receive a non-conducting packing $a^2$, which may be asbestos, mineral wool, or other material. At the angles of the shell the plates are secured together by any suitable means, as by the bolts $a$. The shell is mounted upon any suitable legs or standards, as $a'$. The top B of the shell is preferably separable from its sides, but is similarly constructed, so as to hold the heat.

The furnace C for heating the oven presents no novel features and is inclosed within a chamber D, located below the shell A and open through its bottom and inclosed by walls constructed the same as the walls of the shell and having air-induction ports $d$. The flue $c$ of the furnace C extends upwardly into the oven and discharges into a flue-chamber E coextensive with the floor of the baking-chamber. The flue-chamber E is formed by supporting a metal plate $e$, having upturned edges $e'$, upon T-beams F, carried by pillars $f$, rising from the bottom of the shell A, to which they are preferably secured. The top of the flue-chamber is formed of plates G G, resting upon the upturned edges $e'$ of the plate $e$ and extending inwardly from the sides of the plate $e$, but not meeting, the intervening space being closed by a slab J of firebrick, which is directly above the flue $c$. The plates G G are further supported by inverted-T beams H H', resting upon the plate $e$ and so arranged as to divide the flue-chamber E into two tortuous flue-passages leading to opposite sides of the flue-chamber, and thereby bringing the smoke into contact with all parts of the roof thereof. The flue $c$ enters the chamber E midway between its sides and near the front of the oven. The beams H adjacent to and upon either side of the flue $c$ extend from the front of the chamber E approximately three-fourths of the distance across the same and terminate. Another beam H' is located between each of the beams H and the side of the chamber E and extends from the rear of the same forward about three-fourths of the length of the chamber and stops. At the rear of the chamber E and having its apex directed between the beams H H is a V-shaped deflecting-wall $h$ for insuring the division of the smoke into two columns, one entering each of the tortuous flues.

The discharge from the flue-chamber E is through lateral passages K K, one in the rear end of each side wall of said chamber, these passages each entering a flue-chamber L. The two chambers L L are oblong rectangular in form and are formed by the use of sheet-metal plates secured together in any suitable manner and carried by the beams F. These flues flank the baking-chamber, extending from front to rear of the casing or shell A and reaching upwardly to the top of the baking-chamber. The passages K therefore enter the chambers L L near their bottoms and their rearward ends. Similar discharge-passages $l\,l$ lead upwardly from the flue-chambers L L near their forward ends into a flue-chamber B', formed by the top B of the shell or casing of the oven and a plate M, resting upon the top of the side, front, and rear walls of the casing and forming the roof of the baking-chamber. A final discharge-flue O for the smoke extends through the top B of the oven and is adapted for the attachment of an ordinary smoke-pipe. (Not shown.) The direction of the smoke from the furnace C to the flue O is indicated by arrows.

The plates G G are provided with an upturned flange $g$ along their three outer edges, this flange also extending across the space between the two plates. Within the pan thus formed, and whose bottom consists of the plates G G and slab J, is placed a quantity of sand $p$, and laid upon the sand is a flooring of tile P, constituting the floor of the baking-chamber. The flange $g$ extends a short distance above the tiling P, and within it is set a wall of tiling Q, extending upwardly but not to the plate M. Upon the top of this wall is mounted a metal coping $q$ for locking the several tile together.

A sheet-metal pan R rests upon and covers the bottom of the casing A and is filled with a quantity of sand $r$.

The construction described provides for a commodious receiving-chamber S between the sand in the pan R and the bottom of the flue E, into which is discharged the hot air circulating around the furnace. Space being provided between the sides $c'$ of the flue E and the casing of the flue-chambers L L, and also between the flange $e'$ and the rear wall of the casing A, the hot air ascends from the chamber S around the sides and rear of the baking-chamber and into the same over its wall Q. The smoke in the flues L L still further heats the ascending air. The flues L L are spaced apart from the side walls of the casing A, and air-ports T T are formed within these walls a little below the bottoms of these flues to admit cool air, which, being drawn up between the flues and the walls of the casing, keeps the latter cool and prevents the loss of heat from the oven by radiation, while also preventing the room in which the oven is located from becoming excessively hot. These ports are provided with side dampers $t\,t$, controlled by the rods $t'\,t'$, extending through the front wall of the oven.

The oven-door is shown at U, and is constructed, the same as the walls of the casing A, of two metal plates spaced apart, the intervening space being filled with non-conducting material.

Cleaning-holes for the flues L L are shown at V V, and opposite them in the front wall of the casing A similar holes $v\,v$, closed by suitable caps.

The baking-chamber may be ventilated by means of an aperture $m$ in the plate M, this aperture being closed by a valve $m'$, controlled by means of a rod $m^2$, leading through the front of the oven.

A damper $w$, of ordinary construction, is placed in the flue O and a rod provided for controlling it from the front of the oven.

It is well known that the best results in baking are secured in a brick oven in which there is employed sand for storing the heat, and that the sand also absorbs moisture which is given off during the operation of baking and improves the quality of the bread. By the construction herein disclosed we secure these advantages of the stationary oven in a portable oven, as we believe for the first time.

We claim as our invention—

1. In a portable bake-oven, the combination with a casing, of a pan within the casing and supported above the bottom thereof, a layer of sand within the pan, a flooring of tiling laid upon the sand to form the baking-hearth, and a wall of tiling surrounding such hearth and being spaced apart from the side and rear walls of the casing and from the top of the baking-chamber.

2. In a portable bake-oven, the combination with a shell or casing having its walls packed with non-heat-conducting material, of a furnace inclosed within such casing, a layer of sand upon the bottom of the casing, a pan supported within the pan above the bottom of the casing, a layer of sand within such pan, a hearth of tiling laid upon such last-named layer of sand, a wall of tiling surrounding such hearth and being spaced apart from the side walls of the casing and from the top of the baking-chamber.

3. In a portable bake-oven, the combination with a shell or casing having its walls packed with non-heat-conducting material, of a furnace within the shell or casing, a hearth supported within the shell or casing above its bottom, a wall surrounding the hearth so as to form a baking-chamber and being spaced apart from the side walls of the shell or casing, metal casings forming flue-chambers and being interposed between the walls of the baking-chamber and the side walls of the shell or casing and spaced apart from each, flues leading from the furnace to the flue-chambers, and discharge-flues leading from the flue-chambers.

4. In a portable bake-oven, the combination with a shell or casing, of a furnace within the shell or casing, a horizontal metal casing forming a flue-chamber and being supported within the shell or casing and above its bottom and having its edges spaced apart from the side walls thereof, metal casings supported between the edges of said horizontal flue-chamber and the side walls of the shell or casing and being spaced apart from both and extending above the latter, a baking-hearth supported upon the horizontal flue-casing, walls surrounding the hearth and being spaced apart from the side flue-casing, a flue-passage leading from the furnace to the horizontal flue-chamber, flue-passages connecting the horizontal flue-chamber with the upright flue-chambers and discharge-flues leading from said upright flue-chambers.

5. In a portable bake-oven, the combination with a shell or casing having its walls packed with a non-heat-conducting material, of a furnace-chamber below and opening to the interior of the shell or casing, a baking-chamber formed within the shell or casing and having its side walls spaced apart from the side walls thereof, flue-chambers located between the walls of the baking-chamber and of the shell or casing and being substantially coextensive with the former, flues leading from the furnace to said flue-chambers and discharge-flues leading therefrom, and air-ports through the walls of the furnace-chamber and through the side walls of the shell or casing at the foot of the flue-chambers.

In testimony whereof we affix our signatures in presence of two witnesses.

JEROME LUDWICK.
HARRISON H. AMBORN.

Witnesses:
B. A. DUNLAP,
LOUIS K. GILLSON.